(12) United States Patent
Hudson

(10) Patent No.: US 6,167,926 B1
(45) Date of Patent: Jan. 2, 2001

(54) SELF-ALIGNING DELIMBING APPARATUS

(76) Inventor: Thomas H. Hudson, 2688 Virginia Dr., Hueytown, AL (US) 35023

( * ) Notice: Under 35 U.S.C. 154(b), the term of this patent shall be extended for 0 days.

(21) Appl. No.: 09/392,044

(22) Filed: Sep. 8, 1999

(51) Int. Cl.[7] ................................................ A01G 23/095
(52) U.S. Cl. ........................................ 144/24.13; 144/343
(58) Field of Search ................................ 144/4.1, 24.13, 144/338, 343, 337, 335

(56) References Cited

U.S. PATENT DOCUMENTS

| | | | |
|---|---|---|---|
| 5,515,895 | * | 5/1996 | Hamby, Jr. ........................ 144/24.13 |
| 5,533,555 | * | 7/1996 | Hudson ............................. 144/24.13 |
| 5,704,407 | * | 1/1998 | Hamby .............................. 144/24.13 |
| 5,887,635 | * | 3/1999 | Hamby, Jr. ........................ 144/24.13 |

* cited by examiner

*Primary Examiner*—W. Donald Bray
(74) *Attorney, Agent, or Firm*—Veal & Associates

(57) ABSTRACT

An improved self-aligning tree delimbing apparatus for use in conjunction with a knuckle boom loader having an inner frame member pivotally mounted and concentrically received within an outer frame member, which is rigidly attached to a base member. Pivotally mounted within the inner frame member is a tree delimbing cutter head assembly having opposing pairs of tree guide arms and tree delimbing arms pivotally mounted thereon, thereby allowing for simultaneous multi-dimensional pivotal motion of the cutter head assembly within the frame members. Such motion allows the cutter head assembly to easily align with the longitudinal axis of the trees being delimbed, thereby increasing the efficiency of the apparatus while reducing the binding stresses and necessary force applied by the knuckle boom loader.

20 Claims, 12 Drawing Sheets

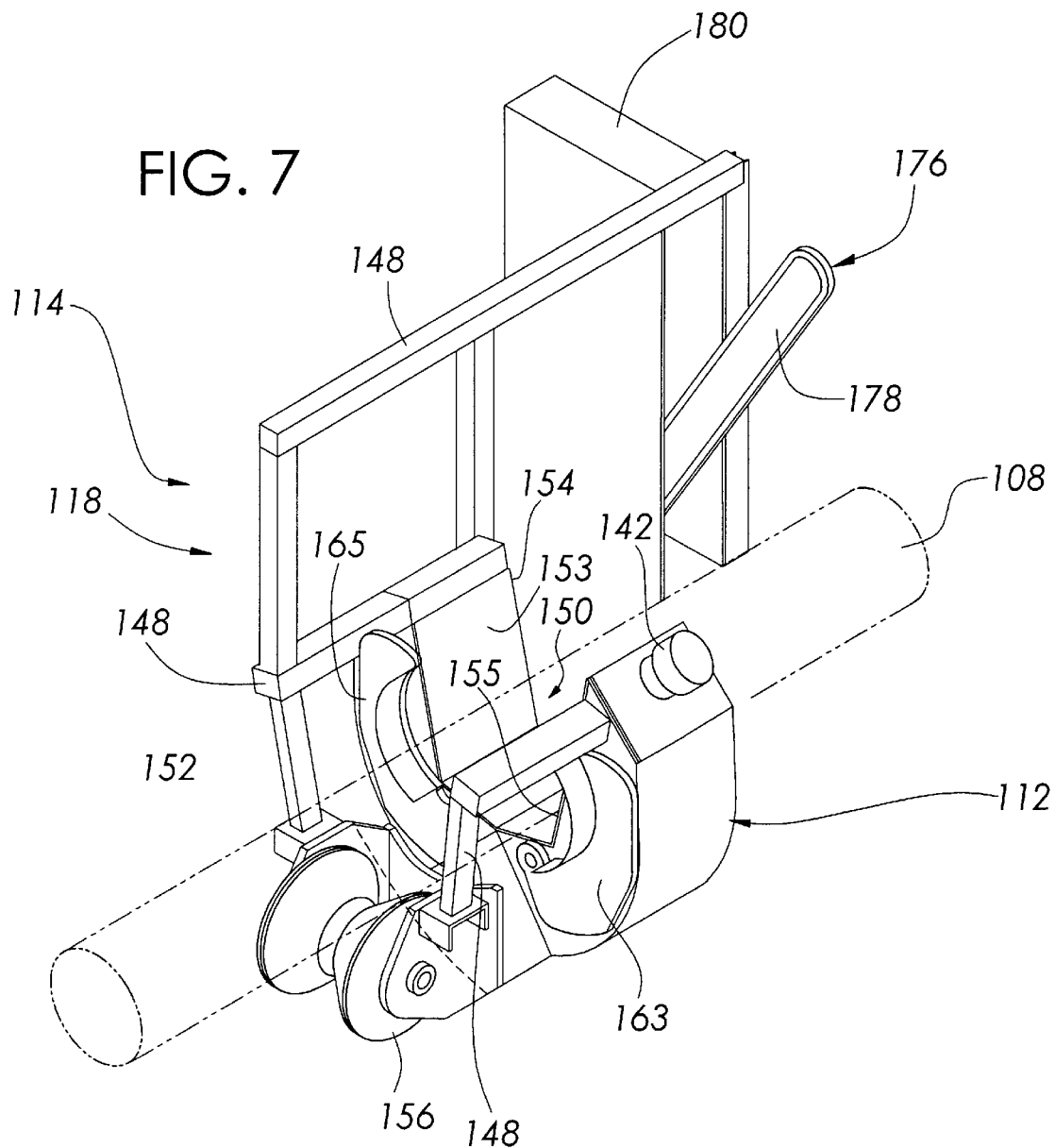

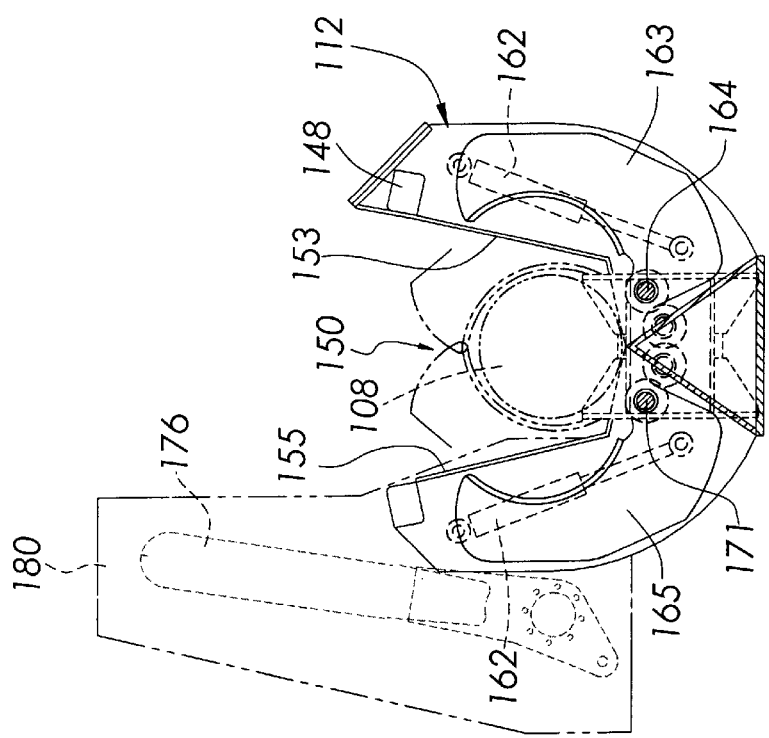
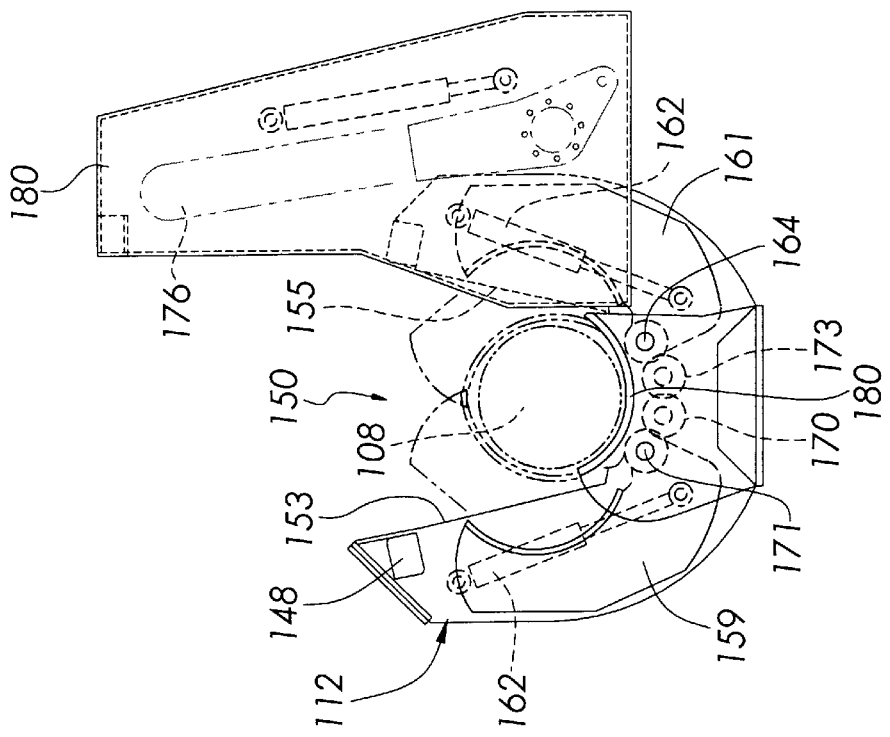
FIG. 9
FIG. 8

SELF-ALIGNING DELIMBING APPARATUS

FIELD OF THE INVENTION

The present invention generally relates to an improved tree delimbing apparatus for use in the forestry industry. More particularly, the present invention relates to an improved delimbing apparatus for use in conjunction with a knuckle boom loader. With even greater particularity, the present invention relates to an improved delimbing apparatus utilizing a cutter head assembly capable of self-alignment with the longitudinal axis of the trees being delimbed. With even greater particularity, the present invention relates to an improved self-aligning tree delimbing apparatus capable of removing limbs from a felled tree as a result of bidirectional longitudinal motion imparted to the felled tree by the knuckle boom loader.

BACKGROUND OF THE INVENTION

Tree delimbing devices are generally known in the forestry and tree harvesting industry. Although various delimber configurations are present in the industry, the most common configuration includes a longitudinal delimbing assembly having a plurality of guide arms encircling a felled tree as it passes through the apparatus. The unwanted limbs of the felled tree are removed by a plurality of stripping arms attached to the apparatus upon longitudinal movement of the tree through the apparatus. Felled trees are generally placed in the delimbing assembly with a mechanical knuckle boom loader or the like, the guide arms and stripping arms are pivotally positioned proximate the felled tree, and the tree is longitudinally moved through the delimbing apparatus by the knuckle boom loader. This longitudinal movement causes the felled tree to engage the stripping arms, thereby shearing the limbs from the felled tree trunk. However, the industry has found that this particular apparatus configuration is prone to gouging the trunks of the felled trees to be delimbed as a result of improper alignment of the felled tree trunks with the axis of the longitudinal delimbing assembly. As a result of this gouging, the usable board foot of the trunk is lessened, thereby decreasing the efficiency and profitability of a timber harvesting operation utilizing such an apparatus. Further, increased stresses are generated and greater horsepower is required to pull the tree through the apparatus, thereby increasing the mechanical fatigue of the apparatus.

In response to this problem, U.S. Pat. No. 4,899,794 to Hamby illustrates a TREE DELIMBING DEVICE WITH SELF ALIGNING CUTTER HEAD, which is designed with the intention of minimizing gouging of trunks. The apparatus embodied in the Hamby patent generally utilizes a substantially rectangular lower base plate having an upper base plate mounted thereto via a swivel and roller assembly for rotational motion of the upper base plate about the swivel via the roller. A yoke member having a cutter head assembly rotatably mounted between substantially vertical yoke arm members is affixed to the upper base plate, such that said yoke rotates with said upper base plate. Thus, it is taught that the vertical axis of rotation provided by the swivel, along with the horizontal axis of rotation provided by the yoke, allows for self-alignment of the cutter head assembly with the longitudinal axis of the felled tree, thereby eliminating gouging of the trunks of the trees. However, the configuration of the Hamby apparatus has nonetheless been found to cause gouging of the trunks as a result of improper cutter head alignment, as well as being prone to binding and breakage as a result of improper and unequal loading of the points of rotation of the apparatus used to longitudinally align the cutter head. Further, the use of the swivel and roller combination has been found susceptible to poor operation as a result of unwanted material obstructing operation of the roller, which further facilitates overloading of the remaining pivot points as well as binding of the device. Therefore, there is a need in the timber and forestry industry for an improved self-aligning felled tree delimbing apparatus capable of efficiently delimbing trees without gouging the trunks, critically binding the apparatus, or overloading the pivot points of the apparatus.

SUMMARY OF THE INVENTION

It is an object of the present invention to provide an improved self-aligning felled tree delimbing apparatus for use in conjunction with a knuckle boom loader. It is a further object of the present invention to provide an improved self-aligning felled tree delimbing apparatus for use in conjunction with a knuckle boom loader capable of self-aligning a delimbing cutter head assembly with the longitudinal axis of a felled tree placed within the apparatus. It is a further object of the present invention to provide an improved self-aligning felled tree delimbing apparatus for use in conjunction with a knuckle boom loader capable of delimbing trees without gouging the trunks. It is yet a further object of the present invention to provide an improved self-aligning felled tree delimbing apparatus for use in conjunction with a knuckle boom loader capable of efficiently delimbing felled trees without binding the operation of the apparatus. It is a further object of the present invention to provide an improved self-aligning felled tree delimbing apparatus for use in conjunction with a knuckle boom loader capable of effectively distributing the pivot point load forces applied to the apparatus as a result of self-alignment of the cutter head assembly with the longitudinal axis of the felled tree. It is yet a further object of the present invention to provide an improved self aligning delimbing apparatus capable of delimbing felled trees as a result of bidirectional longitudinal motion of the felled trees within the delimbing apparatus.

BRIEF DESCRIPTION OF THE DRAWINGS

A device/apparatus embodying the features of the present invention is depicted in the accompanying drawings, which form a portion of this disclosure, wherein:

FIG. 7 is a perspective view of the cutter head assembly;

FIG. 8 is a rear elevational view of the cutter head assembly;

FIG. 9 is a front elevational view of the cutter head assembly

DETAILED DESCRIPTION OF THE PREFERRED EMBODIMENT

Figure 1:
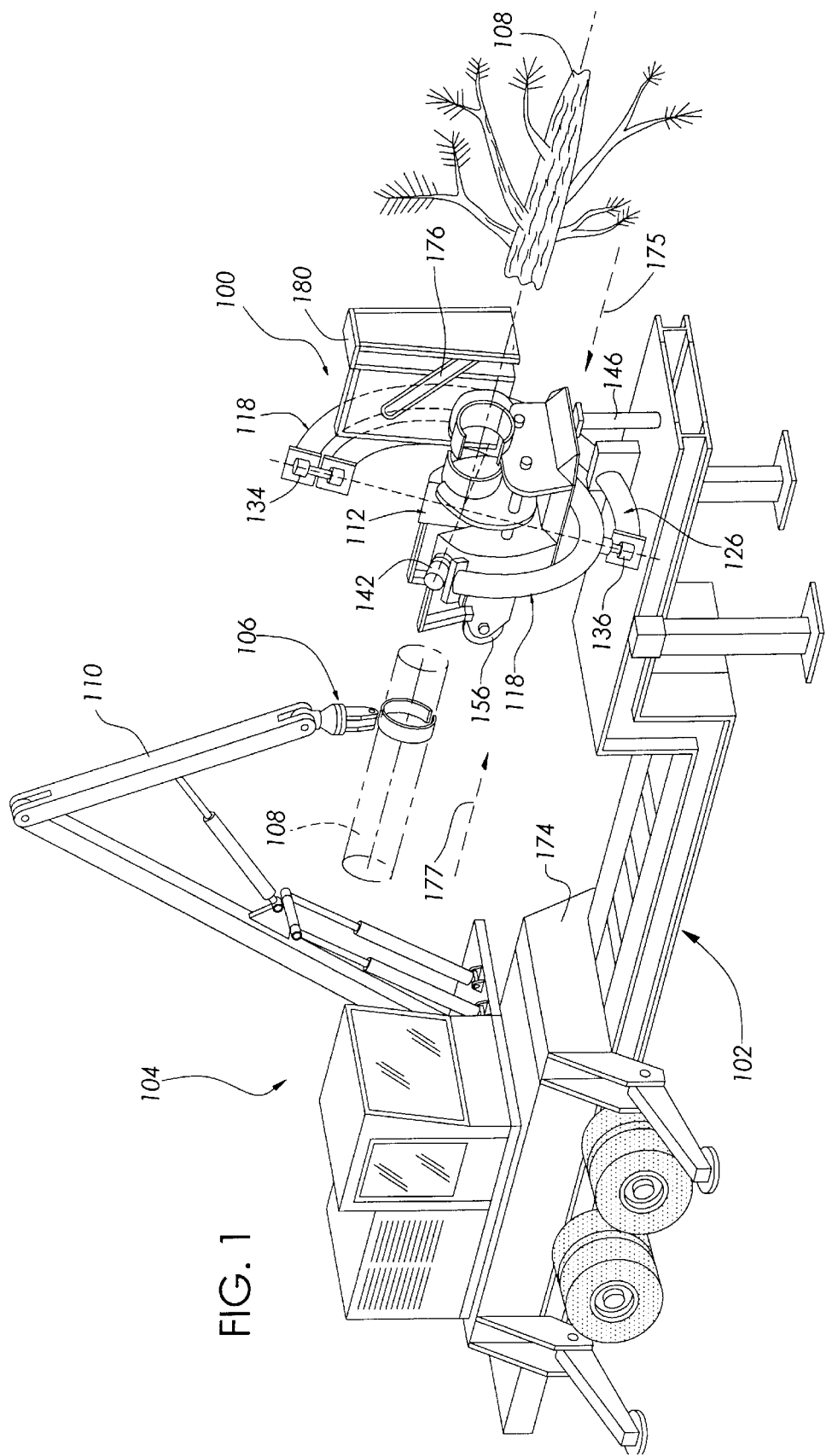
FIG. 1 is a perspective view of the apparatus mounted on a transportable frame member.

Referring to the drawings for a better understanding of the principles of operation and structure of the invention, it will be seen that FIG. 1 generally shows a perspective view of the improved self-aligning apparatus 100 for delimbing felled trees attached to a transportable frame member 102. A rotatable knuckle boom loader 104, which is typically mounted to transportable frame member 102 proximate delimbing apparatus 100, operates to position felled trees 108 within delimbing apparatus 100 via an arm 110, which carries grapple 106. Knuckle boom loader 104 additionally serves to pull felled trees 108 longitudinally through delimbing apparatus 100, thereby allowing for the removal of unwanted limbs from the felled tree trunk by delimbing apparatus 100. Upon removal of the unwanted limbs from the felled tree trunk, delimbing apparatus 100 cuts the trunk to the desired longitudinal length via pivotally mounted driven topping saw 176.

Figure 2:
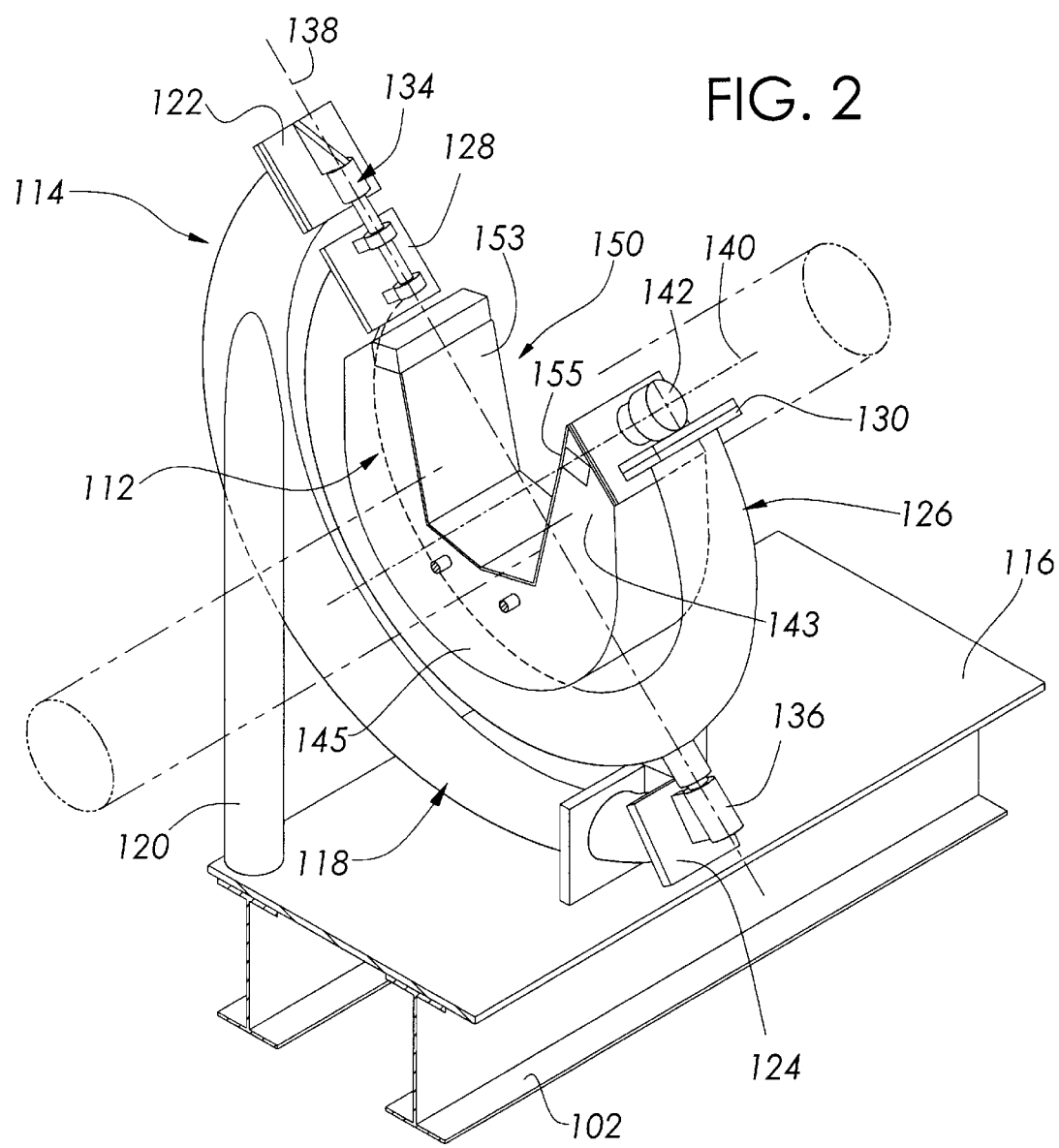
FIG. 2 is a simplified perspective view of the apparatus with the cutter head active components removed.
Figure 3:
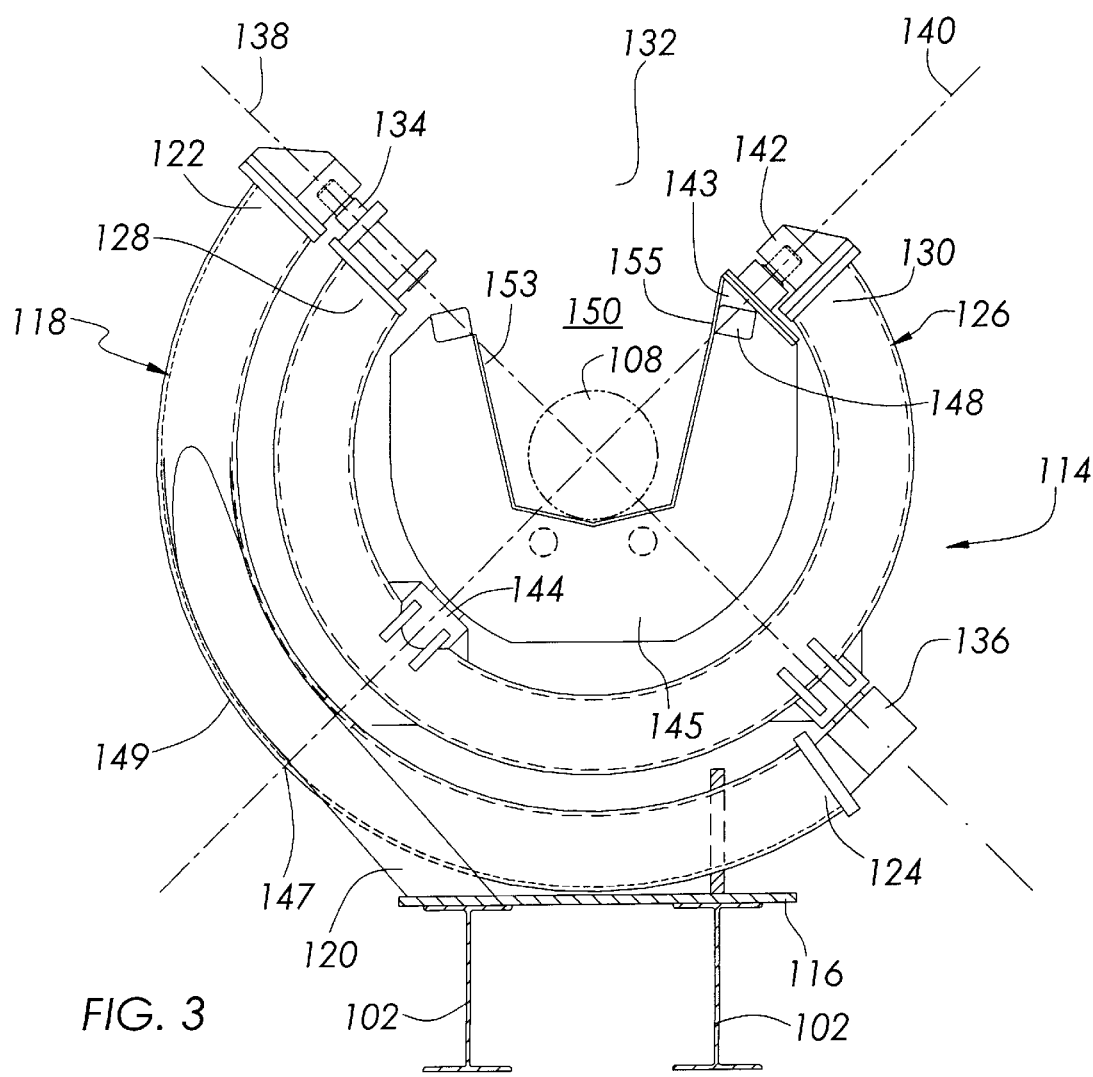
FIG. 3 is a simplified front elevational view of the apparatus with the cutter head active components removed.
Figure 5:
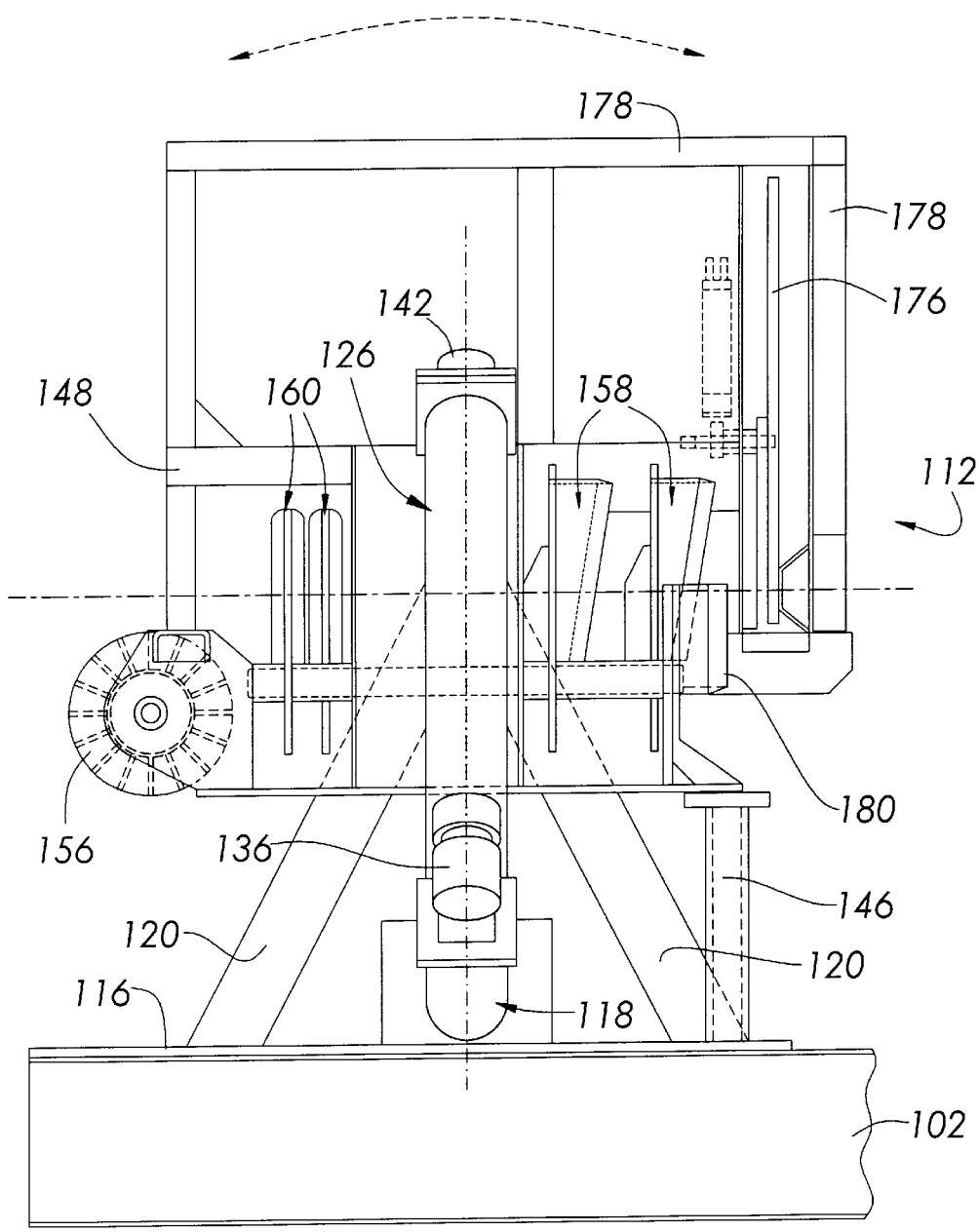
FIG. 5 is a side elevational view of the apparatus as seen from the right side of FIG. 4.

More particularly, self-aligning delimbing apparatus 100, as shown in FIGS. 1, 2, and 3, comprises a cutter head assembly 112 mounted within a gimbal type frame assembly 114. Gimbal type frame assembly 114 operates to permit cutter head assembly 112 to incline freely in any direction within a particular range of motion, thereby allowing for self alignment of cutter head assembly 112 with the longitudinal axis of the trees placed within apparatus 100 for delimbing. In the preferred embodiment illustrated herein, gimbal type frame assembly 114 includes a substantially horizontal base frame member 116 rigidly mounted to transportable frame member 102. A generally semicircular outer frame member 118 of substantially tubular cross section having an upper and lower terminating ends 122 and 124 is rigidly mounted to horizontal base frame member 116 in a substantially vertical orientation, as best shown in FIGS. 3 and 5. Outer frame structural support members 120, which are rigidly attached to horizontal base frame member 116 and outer frame member 118, maintain and support the substantially vertical orientation of outer frame member 118 during operation of apparatus 100.

Figure 4:
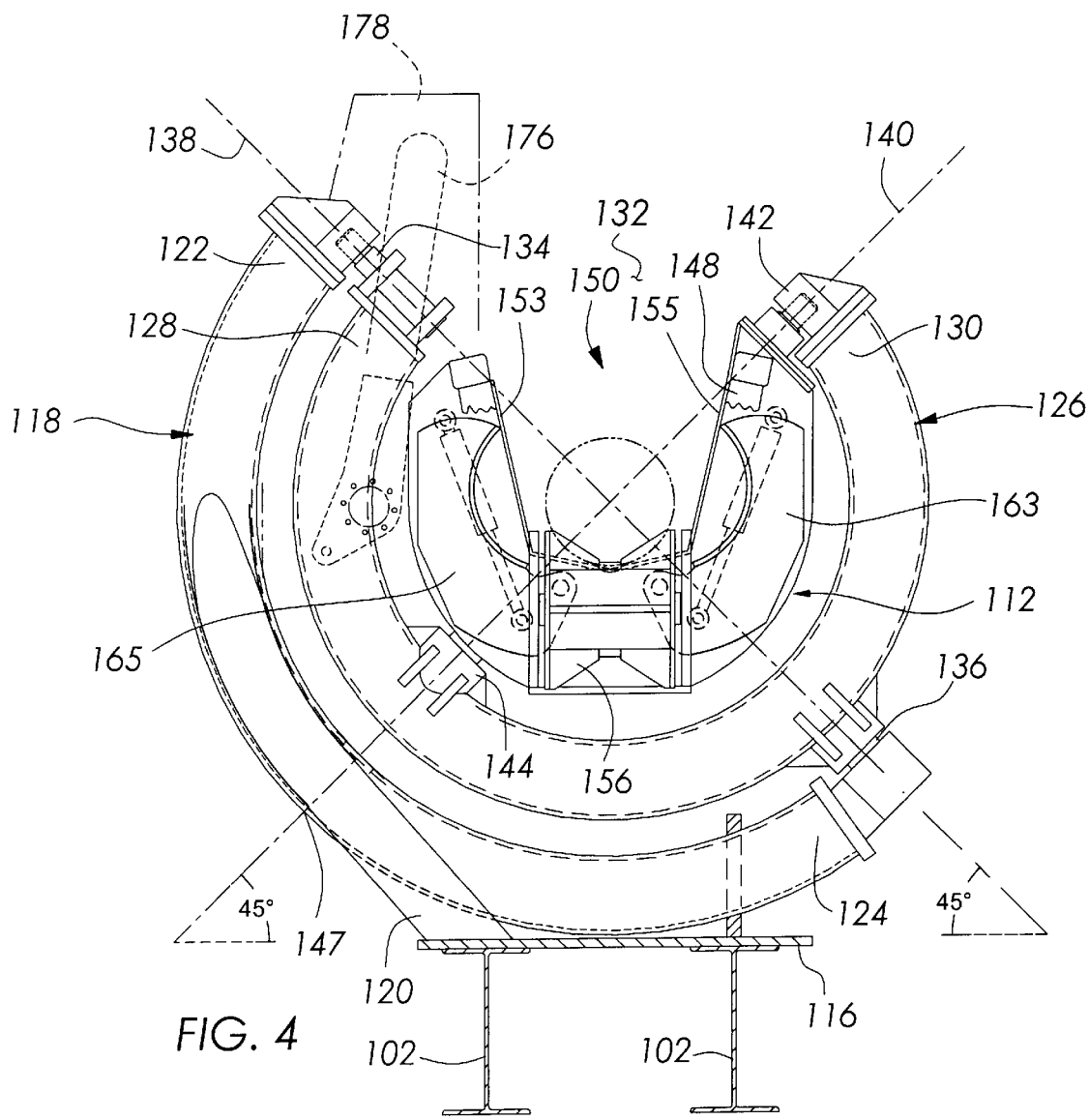
FIG. 4 is a full front elevational view of the apparatus.

Concentrically received within outer frame member 118 is arcuate inner frame member 126, also of substantially tubular cross section, which forms the remaining portion of gimbal type frame member 114. Inner frame member 126 includes a first 128 and second 130 terminating ends forming an opening 132 therebetween, as shown in FIGS. 3 and 4. Inner frame member 126 is concentrically received within outer frame member 118, such that first terminating end 128 of inner frame member 126 is coterminous with upper terminating end 122 of outer frame member 118. Additionally, first terminating end 128 of inner frame member 126 is pivotally secured to upper terminating end 122 of outer frame member 118 at a first location via a first pivotal mounting assembly 134, which will be further discussed herein. A second pivotal mounting assembly 136 pivotally secures inner frame member 126 to outer frame member 118 at a second location. The second location lies upon an axis 138 coincident with a first diameter of outer frame member 118, which is located on the plane forming a 45° angle with horizontal base frame member 116. The combination of first pivotal mounting assembly 134 and second pivotal mounting assembly 136 allows for pivotal rotation of inner frame member 126 within outer frame member 118 about first axis 138.

Figure 13:
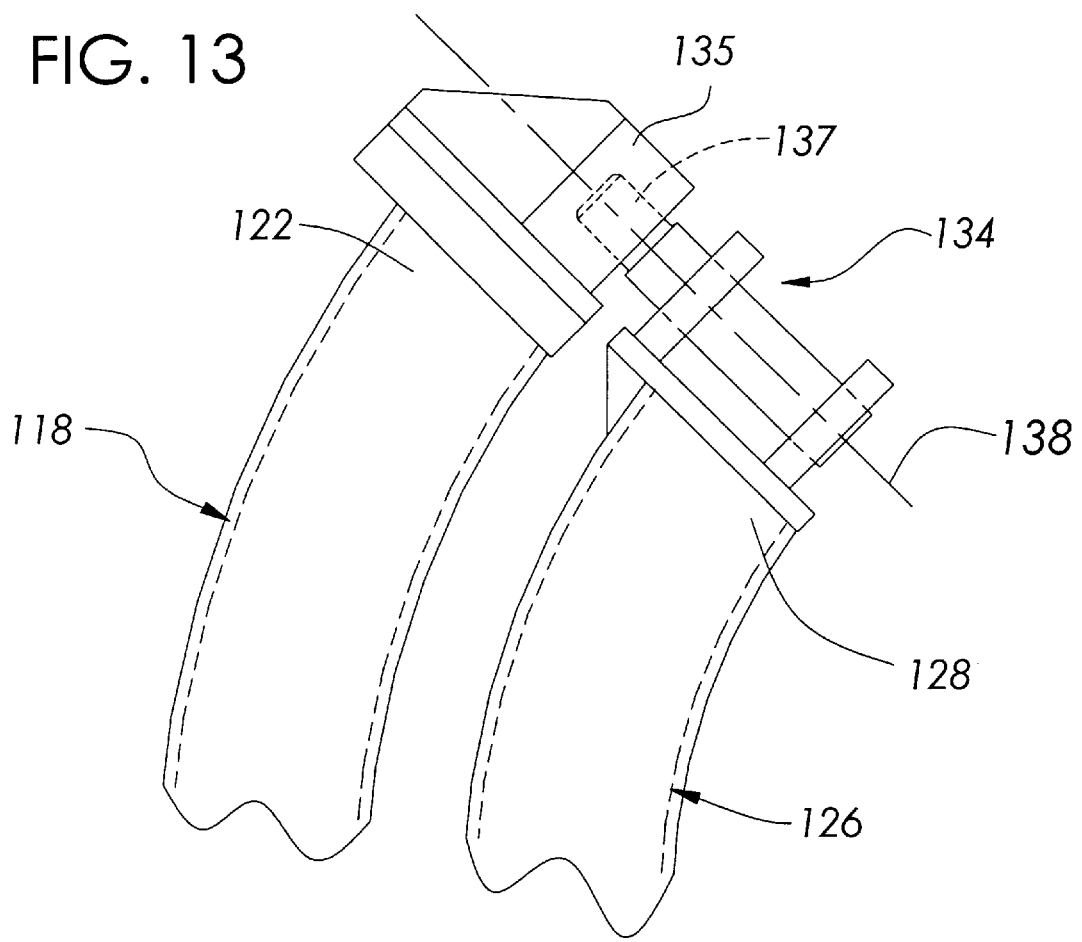
FIG. 13 is a front elevational view of an upper pivotal mounting assembly.

Completing the major components of delimbing apparatus 100 is cutter head assembly 112, which is pivotally mounted within inner frame member 126 about a second axis 140 perpendicular to first axis 138 and passing through the center of outer frame member 118, as shown in FIGS. 3 and 4. Thus, second axis 140 lies in a plane forming a 45° angle with horizontal base frame member 116, and generally bisects the open semi-circular portion of outer frame member 118 between upper terminating end 122 and lower terminating end 124. The first of two pivotal mounting points for cutter head assembly 112, designated upper pivotal mounting assembly 142, is located proximate second terminating end 130 of inner frame member 126 along second axis 140, as shown in FIGS. 3 and 4. Upper pivotal mounting assembly 142 pivotally connects the upper portion 143 of cutter head assembly 112 to second terminating end 130 of inner frame member 126. The second of two pivotal mounting points for cutter head assembly 112, designated lower pivotal mounting assembly 144, is positioned on the lower portion 145 of cutter head assembly 112. Lower pivotal mounting assembly 144 pivotally connects lower portion 145 of cutter head assembly 112 to inner frame member 126 at a location along second axis 140 corresponding generally to the bisection point 147 of the closed portion 149 of outer frame member 118. The combination of first pivotal mounting assembly 142 and second pivotal mounting assembly 144 allows for pivotal rotation of cutter head assembly 112 within inner frame member 126 about second axis 140. Therefore, the combination of pivotal rotation about first axis 138 and second axis 140 allows for pivotal movement of cutter head assembly 112 in any direction without binding the apparatus. However, the pivotal motion of apparatus 100 is limited by stop 146, which is rigidly attached to the horizontal base frame member 116 immediately below the rear portion 152 of the cutter head assembly 112. Thus, stop 146 serves to limit the pivotal rotation of cutter head assembly 112, which will be further discussed herein. The four pivotal mounting assemblies 134, 136, 142, and 144 used to pivotally secure the moving components of gimbal type frame assembly 114 are generally shown in FIG. 13. The pivotal mounting assemblies typically comprise a load supporting bearing assembly 135 rotatably engaged with a load alignment shaft 137, as is generally known in the art. The incorporation of this particular bearing 135 and shaft 137 arrangement allows for pivotal movement about the longitudinal axis of shaft 137.

Figure 6:
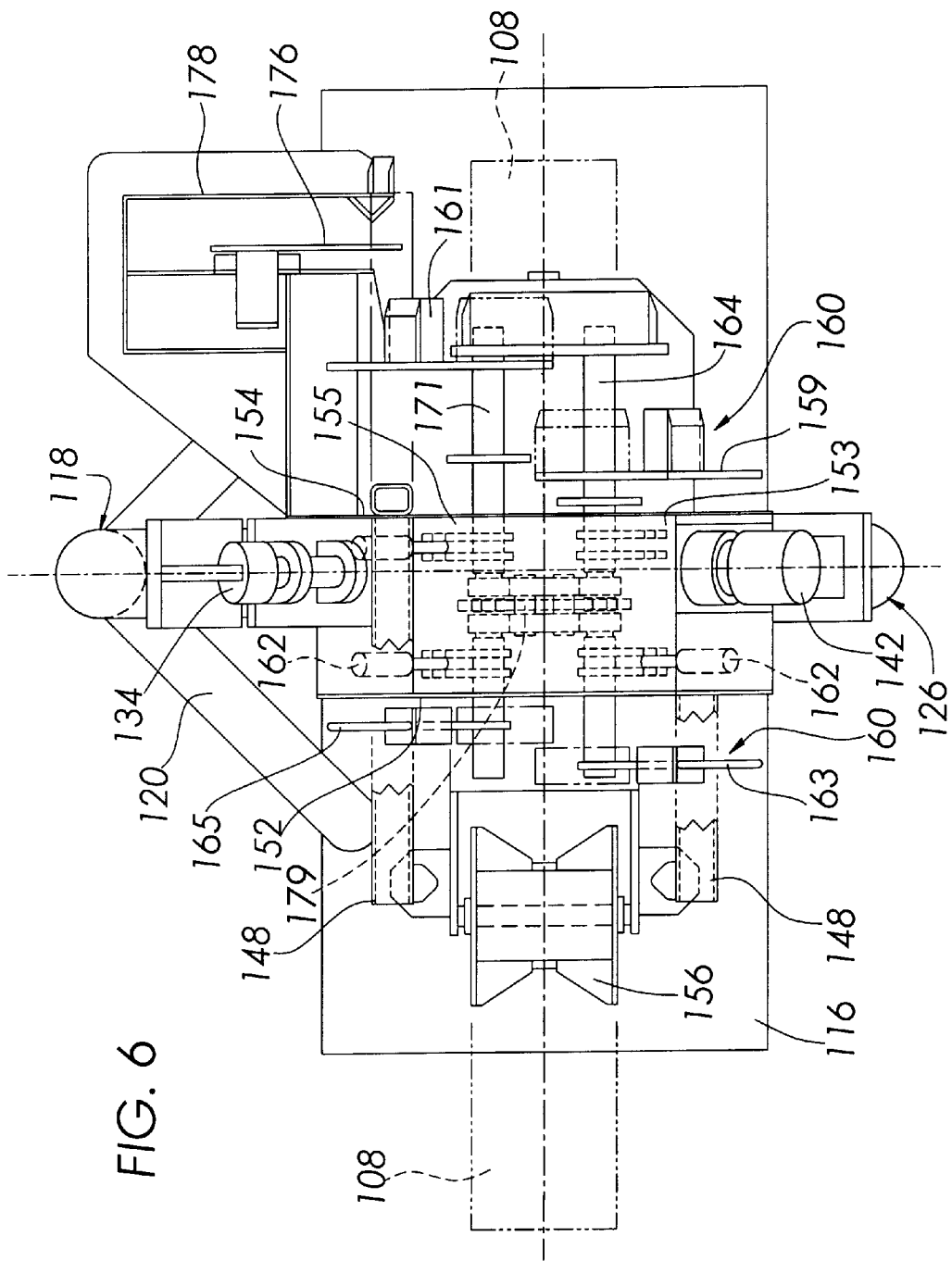
FIG. 6 is a top plan view of the apparatus.
Figure 10:
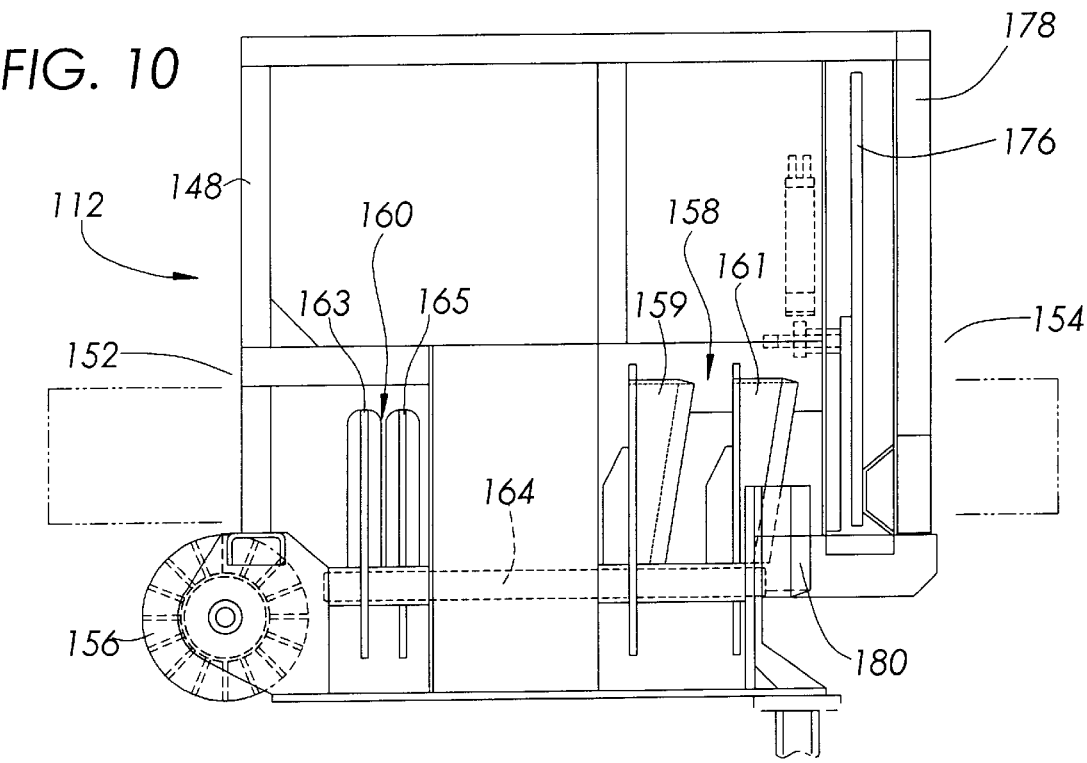
FIG. 10 is a side elevational view of the cutter head assembly.
Figure 11:
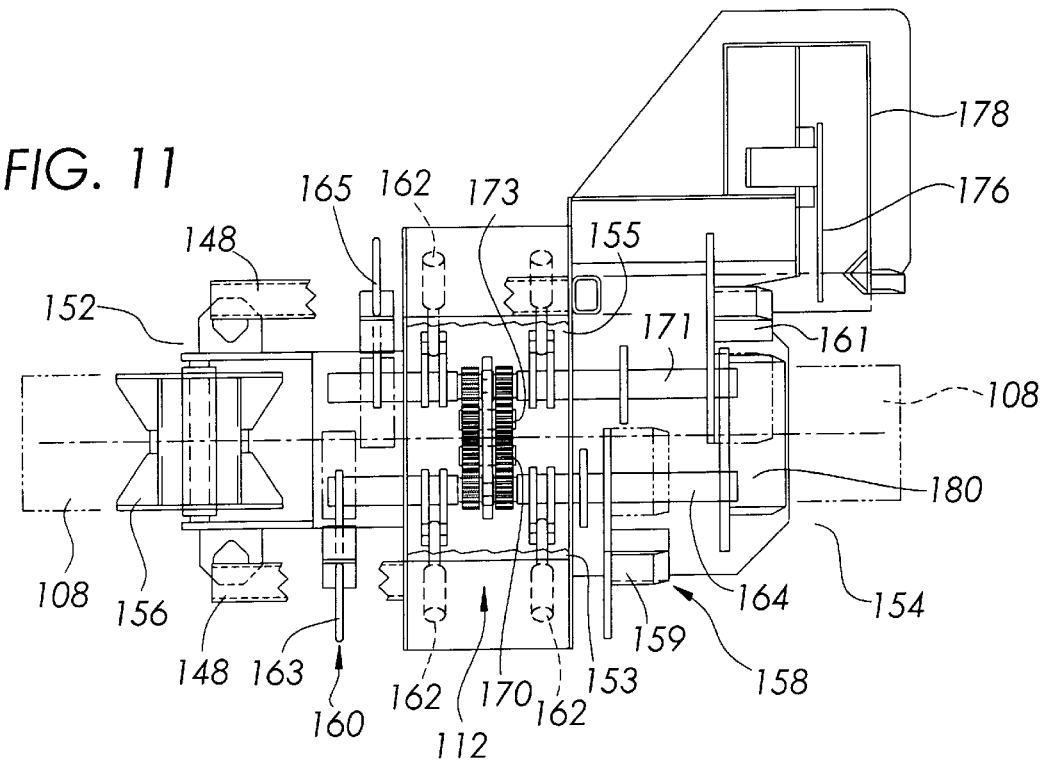
FIG. 11 is a top plan view of the cutter head assembly.
Figure 14:
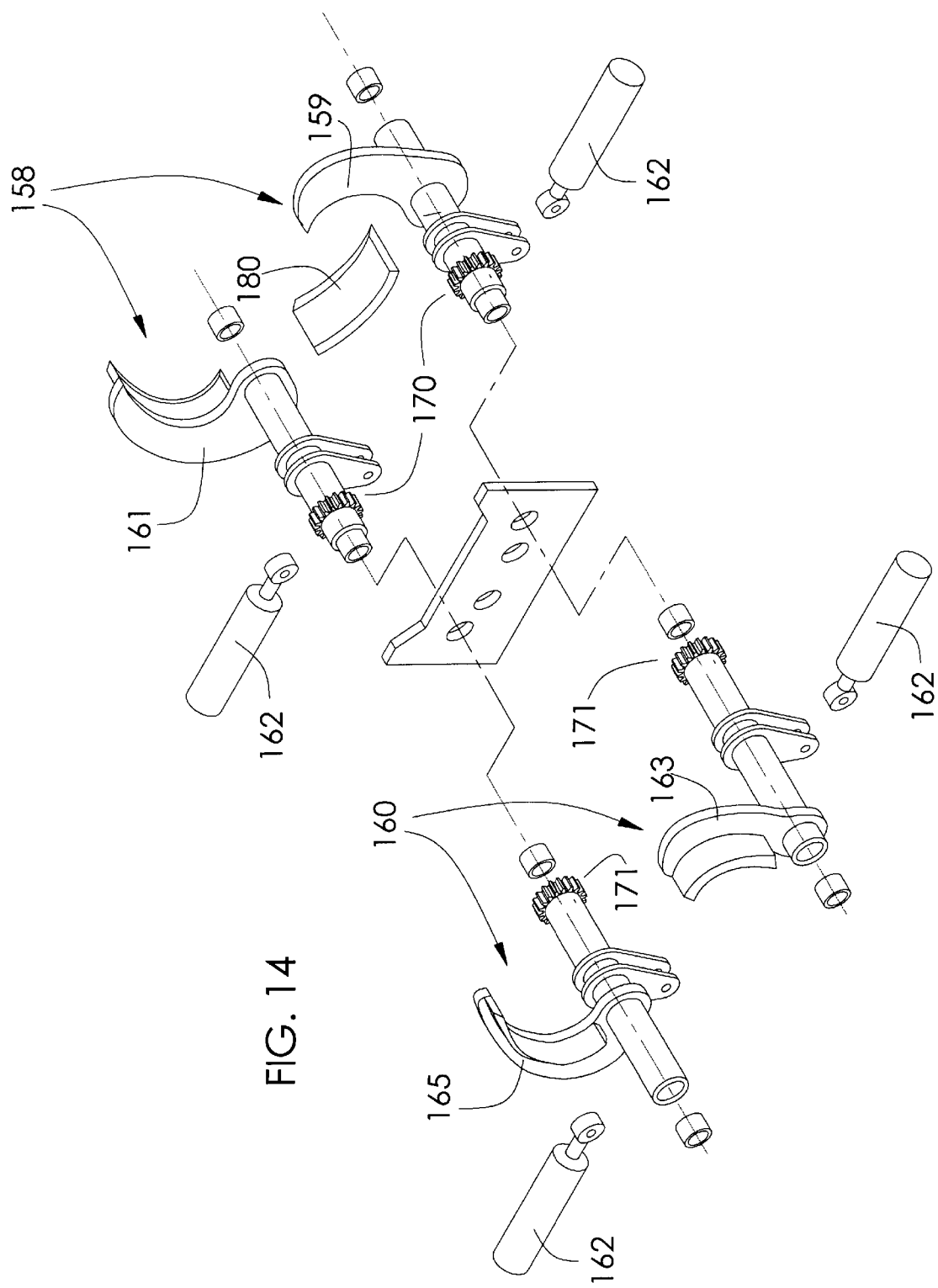
FIG. 14 is a perspective view of the cutter bar and guide arm assemblies with the interconnecting mechanical gears.

The operational components of cutter head assembly 112 include an elongated cutter head frame member 148 forming a longitudinal channel 150 having a first and second substantially vertical elongated channel walls 153, 155. The front portion 152 of longitudinal channel 150 includes a rotatably mounted guide wheel 156 attached thereto for rotatably supporting felled trees 108 placed within longitudinal channel 150, as shown in FIGS. 6 and 10. A pair of spatially positioned opposing limb stripping members 158 are pivotally mounted proximate the rear portion 154 of longitudinal channel 150, as shown in FIGS. 10 and 11. First stripping member 159 is pivotally mounted to extend from first wall 153 of longitudinal channel 150, while second stripping member 161 is pivotally mounted to extend from second wall 155 of longitudinal channel 150. Positioned immediately below first and second stripping members 159 and 161 is stationary stripping member 180, which is rigidly attached to cutter head frame member 148 proximate the rear portion 154 of channel 150. Stripping members 159, 161 are caused to concomitantly pivot between a first open position distal each other, and a second closed position proximate each other, via a first shaft and gear arrangement 170 in engagement with a first selectively actuated hydraulic actuator 162, as shown in FIG. 14. In the closed position, stripping members 159, 161, in conjunction with stationary stripping member 180, completely encircle felled trees 108 within longitudinal channel 150, thereby allowing for shearing of limbs from felled trees 108 from all sides.

A pair of spatially positioned opposing limb guide arm members 110 are pivotally mounted proximate the front portion 152 of longitudinal channel 150, as shown in FIGS. 10 and 11. First limb guide arm member 163 is pivotally mounted to extend from first wall 153 of longitudinal channel 150, while second limb guide arm member 165 is pivotally mounted to extend from the second wall 155 of longitudinal channel 150. Limb guide arm members 163, 165 are caused to concomitantly pivot between a first open position distal each other, and a second closed position proximate each other, via a second shaft and gear arrangement 171 in engagement with a second selectively actuated hydraulic actuator 162, as shown in FIG. 14. In the closed position, the curvature of limb guide arm members 163, 165 serve to enclose and bunch felled trees 108 within longitudinal channel 150 for proper shearing of limbs from felled trees 108 by limb stripping members 158. However, inasmuch as first shaft and gear arrangement 170 is separate and distinct from second shaft and gear arrangement 171, limb stripping members 158 can be selectively opened or closed irrespective of the pivotal movement of limb guide arm members 160. Therefore, apparatus 100 can effectively shear limbs from bowed or untrue felled trees 108 without binding the apparatus, as limb guide arm members 160 are simply left in the open position to account for the variance in the longitudinal axis of bowed timber in these circumstances.

Figure 12:
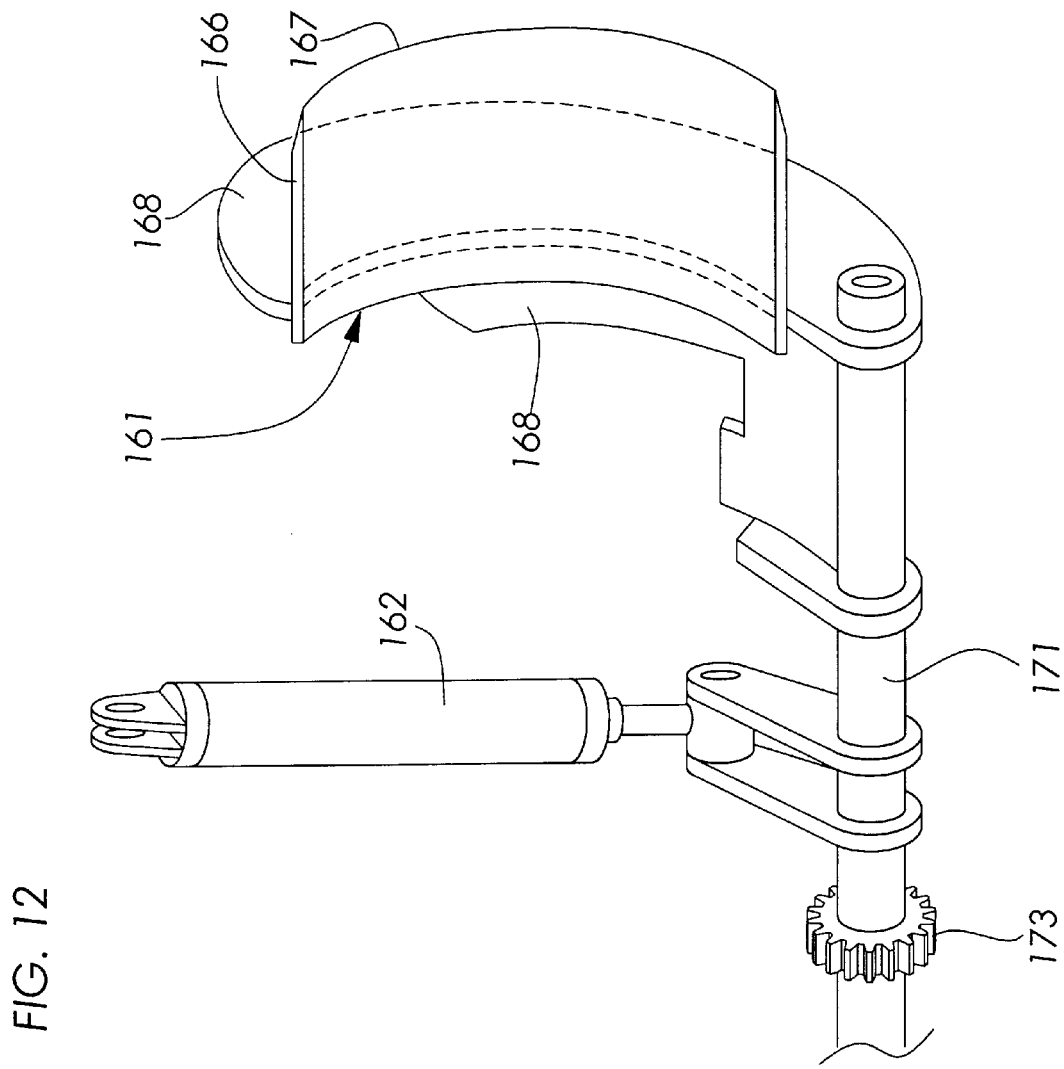
FIG. 12 is a perspective view of the cutter bar and guide arm assemblies.

In greater detail, limb stripping members 158 generally comprise a curved limb stripping support member 168 rigidly attached to a rotatably mounted shaft, which is mechanically interconnected with selectively actuated hydraulic actuator 162, as shown in FIGS. 12 and 14. Limb stripping support member 168 has a curved limb stripping blade 166 orthogonally attached thereto for engaging and shearing limbs from felled trees 108 transported through longitudinal channel 150. Blade 166 includes a first shearing edge 167 positioned upon the terminating edge of blade 166 facing the rear portion 154 of apparatus 100.

Further, it is contemplated within the scope of the present invention for limb guide members 160 to include an orthogonally attached second blade member 169 for assisting in the shearing of limbs from felled trees 108 upon longitudinal movement through channel 150. However, the cutting edge of second blade member 169 is positioned facing front portion 152 of cutter head channel 150, such that upon longitudinal movement of felled trees 108 from front portion 152 towards rear portion 154, second blade member 169 of limb guide arm members 160 engages and shears limbs. As a result of first limb stripping blade 166 facing the rear portion 154 of cutter head assembly 112, in conjunction with second limb stripping blade member 169 facing the front portion 152 of cutter head assembly 112, delimbing apparatus 100 is capable of shearing limbs from felled trees 108 in two longitudinal directions. When felled trees 108 are urged to travel through longitudinal channel 150 in a longitudinal direction from rear portion 154 to front portion 152, first stripping blade member 166 engages and strips limbs from felled trees 108. Alternatively, when the operator reverses the longitudinal direction of movement of felled trees 108 within channel 150, then second blade member 169 engages and strips limbs from felled trees 108, thereby allowing for dual direction limb shearing.

Rear portion 154 of cutter head assembly 112 further includes a driven topping saw 176 for cutting felled trees 108 within longitudinal channel 150 to a predetermined length, as shown in FIGS. 7, 8, and 9. Topping saw 176 generally comprises a chain type blade linearly traveling on a blade track 178, as is typically utilized in a chain saw arrangement. The blade track 178 is pivotally mounted to cutter head frame member 148 proximate rear portion 154 of longitudinal channel 150. Additionally, the blade track is mechanically connected to a hydraulic cylinder, thereby allowing for selective pivotal motion of driven saw 176 from an upper position within shroud 180 to a lower cutting position.

In operation, delimbing apparatus 100 is generally transported to a location proximate the harvesting of raw timber. Trees are felled by various methods and then generally transported proximate delimbing apparatus 100 for processing. At rest, delimbing apparatus 100 is balanced such that the longitudinal axis of channel 150 is at an angle of approximately 30° with horizontal base frame member 116, with the rear portion 154 of longitudinal channel 150 being positioned lower than the front portion 152 of longitudinal channel 150. Apparatus 100 naturally returns to the optimum rest angle as a result of the positioning of the weight of the apparatus, as well as stop 146. Inasmuch as topping saw 176 is positioned proximate the rear 154 of cutter head assembly 112, the rear portion 154 of cutter head assembly 112 is sufficiently heavier than the front portion 152. Thus, when at rest, apparatus 100 is urged to pivot towards the upwardly inclining rest angle, via rear portion 154 being heavier than front portion 152, such that rear portion 154 pivots towards stop 146 until contacting such. Therefore, the rest angle is limited by stop 146, which prevents the angle from increasing above the desired rest angle via direct contact with rear portion 154 of cutter head assembly 112. This particular rest angle allows knuckle boom loader 104 to place felled trees 108 within longitudinal channel 150 without gouging the trunks of felled trees 108, as first limb stripping blade 166 is generally angled away from the longitudinal axis of the tree trunk as a result of the rest angle of delimbing apparatus 100. Upon placing felled trees 108 within longitudinal channel 150 with knuckle boom loader 104, the operator of apparatus 100 selectively actuates hydraulic arm actuators 162, thus causing limb stripping members 158 and limb guide arm members 160 to pivot to a closed position. In the closed position, curved limb guide arms 160 engage felled trees 108 bunching them together in a substantially circular orientation within channel 150. With the felled trees 108 bunched within channel 150, knuckle boom loader 104 pulls felled trees through channel 150 from rear portion 154 of channel 150 towards the front portion 152 of channel 150 causing first limb stripping blade 166 to engage and shear the limbs from felled tree 108. If the desired limbs are not removed from the tree trunk with the first longitudinal movement, the operator may reverse the longitudinal motion of felled trees 108 within channel 150, which causes second blade members 169 of limb guide arm members 160 to engage felled tree 108 to remove remaining limbs.

With the limbs removed as a result of one or more longitudinal movements, the operator then positions the end of the trunk of felled tree 108 against backstop 174 and engages topping saw 176, which cuts the trunk of the tree to the desired length.

Hydraulic actuator 162 is then retracted, thus causing limb stripping members 158 and limb guide arm members 160 to pivot to the open position. The delimbed trees are removed from channel 150, apparatus 100 returns to the rest angle, and the operator repeats the process for the next bunch of felled trees 108.

It is to be understood that the form of the invention shown is a preferred embodiment thereof and that various changes and modifications may be made therein without departing from the spirit of the invention or scope as defined in the following claims.

What is claimed is:

1. An improved self-aligning felled tree delimbing apparatus for use in conjunction with a knuckle boom loader comprising:
   a) an open arcuate outer frame member having an upper and lower terminating ends, said outer frame member being rigidly mounted to a substantially horizontal base member;
   b) an open arcuate inner frame member of sufficient diameter to be concentrically received within said outer frame member and having first and second terminating ends, said inner frame member being pivotally mounted to said upper and lower terminating ends of said outer frame member along a first inclined axis of rotation; and
   c) a delimbing cutter head assembly pivotally mounted within said inner frame member along a second inclined axis of rotation, said second axis being substantially perpendicular to said first inclined axis of rotation.

2. An improved self-aligning felled tree delimbing apparatus for use in conjunction with a knuckle boom loader as defined in claim 1, wherein said open arcuate outer frame member further comprises a substantially semi-circular tubular member orthogonally mounted to said base member, such that said upper and lower terminating ends are aligned along a plane forming a 45° angle with said substantially horizontal base member.

3. An improved self-aligning felled tree delimbing apparatus for use in conjunction with a knuckle boom loader as defined in claim 1, wherein said first terminating end of said inner frame member is coterminous with said upper terminating end of said outer frame member and pivotally mounted thereto for pivotal motion about said first inclined axis by a first pivotal mounting assembly, said second terminating end of said inner frame member terminating proximate said second inclined axis, said outer frame member being pivotally mounted to said inner frame member proximate said lower terminating end of said outer frame member along said first inclined axis by a second pivotal mounting assembly.

4. An improved self-aligning felled tree delimbing apparatus for use in conjunction with a knuckle boom loader as defined in claim 1, wherein said delimbing cutter head assembly further comprises a cutter head frame member having third and fourth pivotal mounting assemblies attached thereto for pivotally engaging said inner frame member, said third pivotal mounting assembly positioned proximate the lower portion of said cutter head frame member for pivotal engagement of said inner frame member along said second inclined axis, said fourth pivotal mounting assembly positioned proximate the upper portion of said cutter head frame member for pivotal engagement of said inner frame member proximate said second terminating end along said second inclined axis, said third and fourth pivotal mounting assemblies being aligned along a plane forming a 45° angle with said substantially horizontal base member.

5. An improved self-aligning felled tree delimbing apparatus for use in conjunction with a knuckle boom loader as defined in claim 1, wherein said delimbing cutter head assembly further comprises:
   a) a plurality of selectively actuated limb stripping members arranged in pairs and in opposing spaced relation, said actuated stripping members being pivotally mounted to said cutter head frame member for pivotal movement about parallel axes, such that each of said stripping members of said pairs pivotally moves between a first closed position proximal the opposing member of said pair, thereby causing said felled trees to be disposed therebetween, and a second open position distal the opposing member of said pair, thereby allowing for the insertion or removal of said felled trees, said stripping members having a first stripping blade attached thereto for shearing limbs from said felled trees in a first longitudinal direction;
   b) a plurality of selectively actuated limb guide arms arranged in pairs and in opposing spaced relation, said actuated guide arms being pivotally mounted to said cutter head frame member for pivotal movement about parallel axes such that each of said guide arms of said pairs pivotally moves between a first closed position proximal the opposing arm of said pair, thereby causing said felled trees to be disposed therebetween, and a second open position distal the opposing arm of said pair, thereby allowing for the insertion or removal of said felled trees, said limb guide arms having a second stripping blade attached thereto for shearing limbs from said felled trees in a second longitudinal direction;
   c) means for selectively and independently pivoting said limb stripping members and said limb guide arms;
   d) means for cutting said felled trees through said felled trees longitudinal axis; and
   e) means attached to said cutter head frame member for rotatably supporting said felled trees within said delimbing apparatus.

6. An improved self-aligning felled tree delimbing apparatus for use in conjunction with a knuckle boom loader as defined in claim 3 or 4, wherein said pivotal mounting assemblies further comprise:
   a) an elongated load supporting alignment shaft of substantially circular cross section rigidly mounted to a pivoting member proximate a first distal end of said shaft, said shaft having a smooth exterior contact surface formed thereon proximate a second distal end of said shaft;
   b) a load supporting bearing assembly rigidly mounted to a stationary member, said bearing assembly having an axial bore formed therein, said axial bore forming a rotatably supported interior bearing surface for receiving said second distal end of said alignment shaft and rotating therewith; and
   c) means for limiting the range of pivotal motion of said cutter head assembly.

7. An improved self-aligning felled tree delimbing apparatus for use in conjunction with a knuckle boom loader as defined in claim 6, wherein said means for limiting the range of pivotal motion further comprises a stop member rigidly mounted to said substantially horizontal base frame member proximate said lower portion of said cutter head assembly, such that the range of pivotal motion of said cutter head assembly is limited by said stop member contacting said lower portion of said cutter head assembly upon pivotal rotation of said cutter head assembly to a predetermined point.

8. An improved self-aligning felled tree delimbing apparatus for use in conjunction with a knuckle boom loader comprising:
   a) an outer frame member rigidly mounted to a substantially horizontal base member, said outer frame member having an upper and lower terminating ends forming a first opening in said outer frame member;
   b) an inner frame member of sufficient size to be received within said outer frame member and having first and second terminating ends forming a second opening in said inner frame member, said inner frame member being pivotally mounted between said upper and lower terminating ends of said outer frame member within said first opening in said outer frame member for pivotal motion about a first inclined axis; and
   c) a delimbing cutter head assembly pivotally mounted to said inner frame member within said second opening in said inner frame member for pivotal motion about a second inclined axis.

9. An improved self-aligning felled tree delimbing apparatus for use in conjunction with a knuckle boom loader as defined in claim 8, wherein said second inclined axis is orthogonally positioned relative to said first inclined axis.

10. An improved self-aligning felled tree delimbing apparatus for use in conjunction with a knuckle boom loader as defined in claim 8, wherein said outer frame member is rigidly mounted to said base member such that said upper and lower terminating ends are aligned along a plane forming a 45° angle with said substantially horizontal base member.

11. An improved self-aligning felled tree delimbing apparatus for use in conjunction with a knuckle boom loader as defined in claim 8, wherein said first terminating end of said inner frame member is coterminous with said upper terminating end of said outer frame member, said first terminating end of said inner frame member being pivotally mounted to said upper terminating end of said outer frame member for pivotal motion about said first inclined axis by a first pivotal mounting assembly, said second terminating end of said inner frame member terminating proximate said second inclined axis, said outer frame member pivotally engaging said inner frame member proximate said lower terminating end of said outer frame member along said first inclined axis via a second pivotal mounting assembly positioned proximate said lower terminating end.

12. An improved self-aligning felled tree delimbing apparatus for use in conjunction with a knuckle boom loader as defined in claim 11, wherein said delimbing cutter head assembly further comprises a cutter head frame member forming a longitudinal channel having a means for rotatably receiving said felled trees, said frame member having a third and fourth pivotal mounting assemblies attached thereto for pivotally engaging said inner frame member, said third pivotal mounting assembly positioned proximate the lower portion of said cutter head frame member for pivotal engagement of said inner frame member along said second inclined axis, said fourth pivotal mounting assembly positioned proximate the upper portion of said cutter head frame member for pivotal engagement of said inner frame member proximate said second terminating end of said inner frame member along said second inclined axis.

13. An improved self-aligning felled tree delimbing apparatus for use in conjunction with a knuckle boom loader as defined in claim 11 or 12, wherein said pivotal mounting assemblies further comprise:
   a) an elongated load supporting alignment shaft of substantially circular cross section rigidly mounted to a pivoting member proximate a first distal end of said shaft, said shaft having a smooth exterior contact surface formed thereon proximate a second distal end of said shaft;
   b) a load supporting bearing assembly rigidly mounted to a stationary member, said bearing assembly having an axial bore formed therein, said axial bore forming a rotatably supported interior bearing surface for receiving said second distal end of said alignment shaft and rotating therewith; and
   c) means for limiting the range of pivotal motion of said cutter head assembly comprising a stop member rigidly mounted to said substantially horizontal base frame member proximate said lower portion of said cutter head assembly, such that the range of pivotal motion of said cutter head assembly is limited by said stop member contacting said cutter head assembly upon pivotal rotation of said cutter head assembly to a predetermined point.

14. An improved self-aligning felled tree delimbing apparatus for use in conjunction with a knuckle boom loader as defined in claim 12, wherein said third and fourth pivotal mounting assemblies are aligned along a plane forming a 45° angle with said substantially horizontal base member.

15. An improved self-aligning felled tree delimbing apparatus for use in conjunction with a knuckle boom loader as defined in claim 8, wherein said delimbing cutter head assembly further comprises:
   a) a plurality of hydraulically actuated limb stripping members arranged in opposing pairs and in spaced relation, said actuated stripping members being pivotally mounted to said cutter head frame member for pivotal movement about parallel axes such that each of said stripping members of said pairs pivotally moves between a first closed position proximal the opposing member of said pair, thereby causing said felled trees to be disposed therebetween, and a second open position distal said opposing member of said pair, thereby allowing for the insertion or removal of said felled trees, said limb stripping members having a first limb shearing blade attached thereto for shearing limbs from said felled trees upon movement of said trees in a first longitudinal direction;
   b) a plurality of hydraulically actuated limb guide arms arranged in opposing pairs and in spaced relation, said actuated guide arms being pivotally mounted to said cutter head frame member for pivotal movement about parallel axes such that each of said guide arms of said pairs pivotally moves between a first closed position proximal the opposing arm of said pair, thereby causing said felled trees to be disposed and bunched therebetween, and a second open position distal the opposing arm of said pair, thereby allowing for the insertion of new trees to be delimbed or removal of trees already delimbed by the apparatus, said limb guide arms having a second limb shearing blade attached thereto for shearing limbs from said felled trees upon movement of said felled trees in a second longitudinal direction; and
   c) a driven topping saw for cutting said felled trees through a plane substantially perpendicular to said felled trees longitudinal axis.

16. An improved self-aligning felled tree delimbing apparatus for use in conjunction with a knuckle boom loader comprising:

a) a substantially horizontal rigid base frame member;

b) a semi-circular outer frame member of substantially tubular cross section rigidly mounted to said base member, said outer frame member having an upper terminating end and a lower terminating end, said upper and lower terminating ends being aligned along a first inclined axis lying within a plane forming a 45° angle with said substantially horizontal base member;

c) an inner frame member of substantially tubular cross section having a substantially circular curvature concentrically received and pivotally mounted within said outer frame member, said inner frame member having a first and second terminating ends forming an opening, said first terminating end being coterminous and pivotally mounted to said upper terminating end of said outer frame member at a first location via a first pivotal mounting assembly, said inner frame member being pivotally mounted to said outer frame member at a second location via a second pivotal mounting assembly, thereby allowing for pivotal motion of said inner frame member about said first inclined axis, said second terminating end of said inner frame member terminating proximate a second inclined axis lying within a plane forming a 45° angle with said substantially horizontal base member and positioned orthogonally with respect to said first inclined axis; and d) an elongated delimbing cutter head assembly pivotally mounted within said inner frame member about said second inclined axis for receiving and delimbing said felled trees.

17. An improved self-aligning felled tree delimbing apparatus for use in conjunction with a knuckle boom loader as defined in claim 16, wherein said cutter head assembly further comprises a cutter head frame member forming a longitudinal channel for receiving said felled trees, said frame member having third and fourth pivotal mounting assemblies attached thereto for pivotally engaging said inner frame member, said third pivotal mounting assembly being positioned proximate the lower portion of said cutter head frame member for pivotal engagement of said inner frame member along said inclined second axis, said fourth pivotal mounting assembly positioned proximate the upper portion of said cutter head frame member for pivotal engagement of said inner frame member proximate said second terminating end of said inner frame member along said second inclined axis, said third and fourth pivotal mounting assemblies being aligned along a plane forming a 45° angle with said substantially horizontal base member.

18. An improved self-aligning felled tree delimbing apparatus for use in conjunction with a knuckle boom loader as defined in claim 16, wherein said delimbing cutter head assembly further comprises:

a) two hydraulically actuated limb stripping members arranged in opposing spaced relation, said actuated limb stripping members being pivotally mounted to said cutter head frame member for pivotal movement about parallel axes such that each of said limb stripping members pivotally moves between a first closed position proximal the opposing member, thereby causing said felled trees to be disposed therebetween, and a second open position distal said opposing member, thereby allowing for the insertion or removal of said felled trees, said limb stripping members having a first limb shearing blade attached thereto for shearing limbs from said felled trees upon movement of said trees in a first longitudinal direction;

b) two hydraulically actuated limb guide arms arranged in opposing spaced relation, said actuated guide arms being pivotally mounted to said cutter head frame member for pivotal movement about parallel axes such that each of said guide arms pivotally moves between a first closed position proximal the opposing arm of said pair, thereby causing said felled trees to be bunched therebetween, and a second open position distal the opposing arm, thereby allowing for the insertion of new trees to be delimbed or removal of trees already delimbed by the apparatus, said limb guide arms having a second limb shearing blade attached thereto for shearing limbs from said felled trees upon movement of said felled trees in a second longitudinal direction; and c) a driven topping saw for cutting said felled trees through a plane substantially perpendicular to said felled trees longitudinal axis.

19. An improved self-aligning felled tree delimbing apparatus for use in conjunction with a knuckle boom loader as defined in claims 16 or 17, wherein said pivotal mounting assemblies further comprise:

a) an elongated load supporting alignment shaft of substantially circular cross section rigidly mounted to a pivoting member proximate a first distal end of said shaft, said shaft having a smooth exterior contact surface formed thereon proximate a second distal end of said shaft; and b) a load supporting bearing assembly rigidly mounted to a stationary member, said bearing assembly having an axial bore formed therein, said axial bore forming a rotatably supported interior bearing surface for receiving said second distal end of said alignment shaft and rotating therewith.

20. An improved self-aligning felled tree delimbing apparatus for use in conjunction with a knuckle boom loader as defined in claim 19, further comprising means for limiting the pivotal motion of said cutter head assembly comprising a stop member rigidly attached to said horizontal base frame member immediately below said rear portion of said cutter head assembly, such that upon pivotal motion of said cutter head assembly to a predetermined point, said stop member engages said cutter head assembly and thereafter stops the pivotal motion of said cutter head assembly.

\* \* \* \* \*